(12) United States Patent
Yamauchi

(10) Patent No.: US 8,117,511 B2
(45) Date of Patent: Feb. 14, 2012

(54) COMMUNICATION DEVICE AND METHOD OF CORRECTING THE SAME

(75) Inventor: Satomi Yamauchi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 440 days.

(21) Appl. No.: 12/410,777

(22) Filed: Mar. 25, 2009

(65) Prior Publication Data

US 2009/0245231 A1 Oct. 1, 2009

(30) Foreign Application Priority Data

Mar. 31, 2008 (JP) .................................. 2008-091543

(51) Int. Cl.
 *G01R 31/28* (2006.01)
(52) U.S. Cl. ........................... 714/731; 370/350; 340/3.2
(58) Field of Classification Search .................. 370/310, 370/345, 350; 340/1.1, 3.1, 3.2; 714/699, 714/724, 726, 731
See application file for complete search history.

(56) References Cited

U.S. PATENT DOCUMENTS 5,608,765 A * 3/1997 Tanoue .......................... 375/365
6,748,040 B1 * 6/2004 Johnson et al. ................ 375/354

FOREIGN PATENT DOCUMENTS

| JP | 2001186204 A | * | 7/2001 |
| JP | 2004-282264 | | 10/2004 |
| JP | 2004282264 A | * | 10/2004 |

* cited by examiner

*Primary Examiner* — Chi Pham
*Assistant Examiner* — Weibin Huang
(74) *Attorney, Agent, or Firm* — Young & Thompson

(57) ABSTRACT

A communication device includes a reference clock generator that generates a first reference clock signal, and a super frame timer that clocks a period of super frame based on the first reference clock signal generated by the reference clock generator. The communication device further includes a physical layer that performs wireless communication and generates a second reference clock signal, and a timer correcting part that corrects an error in the clocking in the super frame timer based on the first reference clock signal generated by the reference clock generator and the second reference clock signal generated by the physical layer.

4 Claims, 5 Drawing Sheets

PRIOR ART

COMMUNICATION DEVICE AND METHOD OF CORRECTING THE SAME

BACKGROUND

1. Field of the Invention

The present invention relates to a communication device that performs wireless communication and a method of correcting the same, and more particularly, to a communication device that performs correction of an error generated in clocking a super frame period and a method of correcting the same.

2. Description of Related Art

In a communication mode by WUSB, in which the USB communication is made wireless using Ultra Wide Band (UWB), a plurality of WUSB devices are connected around one WUSB host. Such a WUSB host and WUSB device perform wireless communication based on a period called super frame, which is defined in the WiMedia standard. Accordingly, there is a need to make correspondence of the super frame of the WUSB host and the WUSB device to the period defined in the WiMedia standard. In the WiMedia standard, the accuracy allowable range of the super frame timer that clocks the super frame period is defined to be 20 ppm.

Accordingly, the WUSB host and the WUSB device complied with the WiMedia standard need to operate each super frame timer within the accuracy allowable range. When the accuracy of the super frame timer has the value outside the accuracy allowable range, communication collision may occur with other WUSB devices, which causes damage in data transfer. In order to prevent this, each super frame timer needs to be corrected in a way that the accuracy of each super frame timer of the WUSB host and the WUSB device is within the accuracy allowable range.

For example, the super frame timer is controlled based on a system clock signal. Further, the accuracy of the system clock signal depends on an external crystal oscillator. When the accuracy of the external crystal oscillator decreases, the accuracy of the system clock signal decreases as well. This results in decrease of the accuracy of the super frame timer, and the accuracy may be out of the accuracy allowable range.

One of the methods for correcting the accuracy of the super frame timer includes a method of changing the external crystal oscillator. In this method, the load capacitance is calculated on paper after determining a board circuit, and the external crystal oscillator that matches the load capacitance is mounted on the board circuit. Note that the oscillation frequency itself of the external crystal oscillator is determined by the characteristics of the crystal oscillator.

Furthermore, there is a method of correcting a ratio value R of a register to a proper value using an external measurement device as a method of correcting the accuracy of the super frame timer by software. The ratio value R is the value that sets the ratio of a natural period (fixed cycle) of the super frame timer and the system clock. In correcting the super frame timer, a difference value (65539 us−65536 us=3 us, for example) that indicates how much the super frame period (65539 us, for example) of the WUSB host measured by the external measurement device is deviated from the standard value (65536 us) is calculated first. Then, the optimal ratio value R is calculated using the difference value, and set in a serial ROM as an initial value. Further, it is checked whether the super frame period is corrected to the expectation value using the external measurement device again.

On the other hand, Japanese Unexamined Patent Application Publication No. 2004-282264 discloses a mobile phone capable of automatically performing an RTC correction based on a frequency error calculated by comparing a clock signal from an RTC with a clock signal from a reference clock generator.

However, the present inventors have found a problem as follows. That is, the correction method of changing the external crystal oscillator needs operation such as soldering or replacement of the external crystal oscillator, which increases the burden for a user. Further, the correction method by software needs measurement by the external measurement device in calculating the difference value, which means this method is subjected to the constraints by the external measurement device. Furthermore, the calculation processing by human being is required in calculating the final ratio value R, which increases the burden for the user. The RTC correction is performed in the mobile phone disclosed in Japanese Unexamined Patent Application Publication No. 2004-282264; however, there is no description regarding the error correction of the super frame period clocked by the super frame timer.

SUMMARY

A first exemplary aspect of an embodiment of the present invention is a communication device, including a reference clock generator that generates a first reference clock signal, a super frame timer that clocks a period of super frame based on the first reference clock signal generated by the reference clock generator, a physical layer that performs wireless communication and generates a second reference clock signal, a timer correcting part that corrects an error in the clocking in the super frame timer based on the first reference clock signal generated by the reference clock generator and the second reference clock signal generated by the physical layer.

According to the first exemplary aspect, the timer correcting part automatically corrects the error in the clocking in the super frame timer with reference to the second reference clock signal generated by the physical layer satisfying the WiMedia standard. Accordingly, the error correction of the super frame timer can be performed in a simple way.

A second exemplary aspect of an embodiment of the present invention is a method of correcting a communication device, the method including generating a first reference clock signal, clocking a period of super frame based on the first reference clock signal, performing wireless communication and generating a second reference clock signal by a physical layer, and correcting an error in the clocking based on the first reference clock signal and the second reference clock signal.

According to the second exemplary aspect, the error in the clocking in the super frame timer is automatically corrected with reference to the second reference clock signal generated by the physical layer satisfying the WiMedia standard in correcting the timer. Accordingly, the error correction of the super frame timer can be performed in a simple way.

According to the present invention, the error correction of the super frame timer can be performed in a simple manner.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Figure 1:
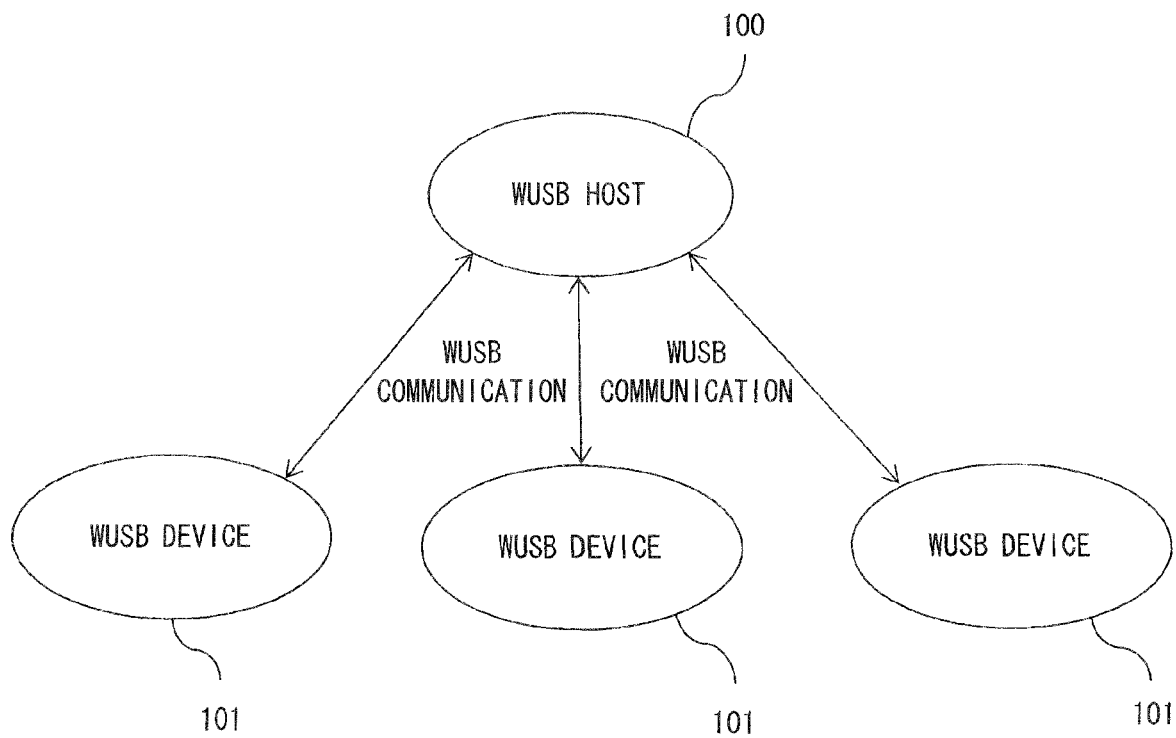
FIG. 1 shows one configuration example of a WUSB host and WUSB devices mounting a communication device according to an exemplary embodiment of the present invention.

The exemplary embodiment of the present invention will be described hereinafter in detail with reference to the accompanying drawings. FIG. 1 is a configuration example of a WUSB host and WUSB devices that mount a communication device according to the exemplary embodiment of the present invention.

As shown in FIG. 1, in a communication mode by WUSB, a plurality of WUSB devices 101 are connected around one WUSB host 100. Now, WUSB is what the USB communication is made wireless using Ultra Wide Band (hereinafter referred to as UWB). Further, USB (Universal Serial Bus) is the standard of interface for the purpose of connecting a PC and a peripheral device. Further, the WUSB host 100 is a controller for controlling the USB interface, for example, and is mounted in a PC. The WUSB device 101 is the peripheral device connected to the PC.

In the wireless data communication by WUSB, a super frame is defined as a unit of time segment (period) using MAC (Medium Access Control) as communication medium. This MAC is defined based on the standard (hereinafter referred to as WiMedia standard) of a non-profit organization (WiMedia Alliance) that performs certification or the like of the UWB protocol for performing data transmission and reception.

The WUSB host 100 and each of the WUSB devices 101 execute wireless communication in accordance with the period called super frame, which is defined in the WiMedia standard. The super frame is 65536 us in length in one segment (one period). One super frame is further divided into 256 areas. Each area is called MAS (Medium access slots), and one MAS is 256 us in length. The WUSB host 100 controls all the schedules of data transfer, and the WUSB device 101 performs data transfer according to the control instruction by the WUSB host 100. The WUSB host 100 reserves the MAS in the super frame for performing data transfer, to schedule the data transfer.

Figure 2:
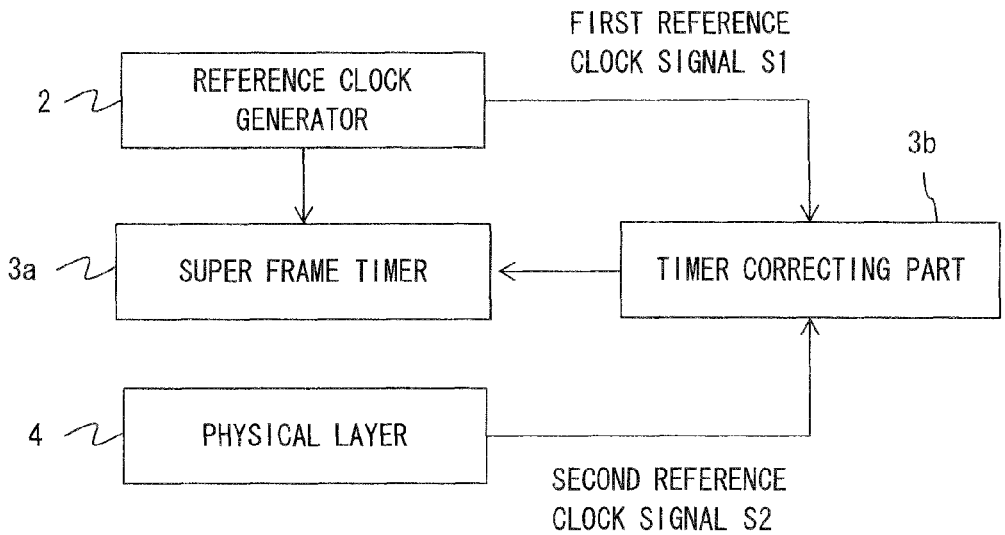
FIG. 2 is a functional block diagram of the communication device according to the exemplary embodiment of the present invention.

FIG. 2 is a functional block diagram of the communication device according to the exemplary embodiment of the present invention. A communication device 1 according to the exemplary embodiment includes a reference clock generator 2 generating a first reference clock signal S1, and a super frame timer 3a clocking the period (time) of the super frame based on the first reference clock signal S1 generated by the reference clock generator 2.

The communication device 1 further includes a physical layer 4 performing the WUSB communication and generating a second reference clock signal S2, and a timer correcting part 3b correcting the error of the super frame period clocked by the super frame timer 3a based on the first reference clock signal S1 generated by the reference clock generator 2 and the second reference clock signal S2 generated by the physical layer 4. According to this exemplary embodiment, the timer correcting part 3b automatically corrects the error of the super frame period clocked by the super frame timer 3a with reference to the second reference clock signal S2 of the physical layer 4 satisfying the WiMedia standard. Accordingly, it is possible to perform the error correction of the super frame timer 3a in a simple manner.

Figure 3:
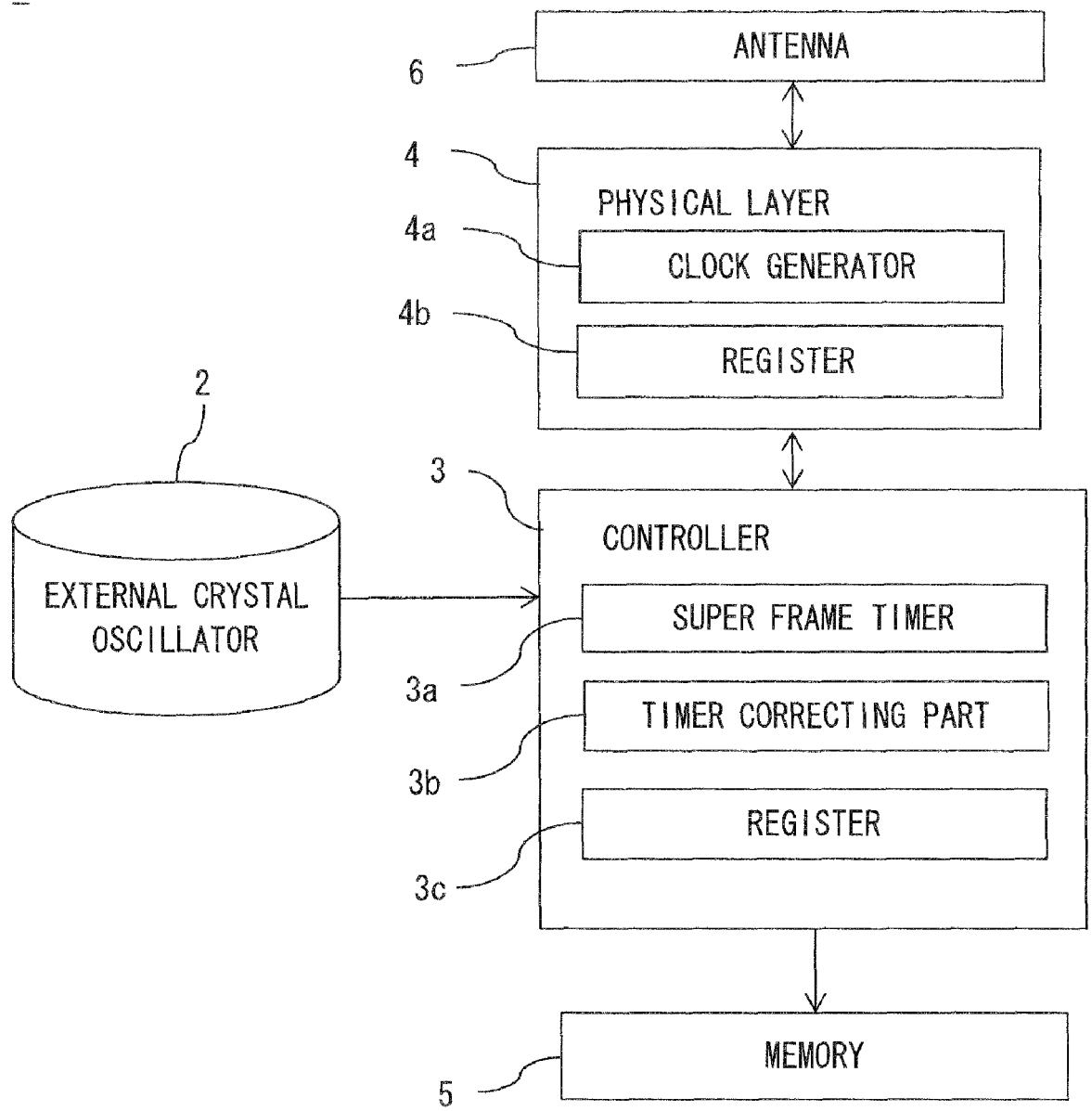
FIG. 3 is a block diagram showing an example of the system configuration of the communication device according to the exemplary embodiment of the present invention.

FIG. 3 is a block diagram showing an example of the system configuration of the communication device 1 according to the exemplary embodiment. The communication device 1 according to the exemplary embodiment is an interface board attached to the WUSB host 100, for example.

The communication device 1 according to the exemplary embodiment includes an external crystal oscillator 2, a controller 3, a physical layer 4, a memory 5, and an antenna 6.

The controller 3 is formed of a CPU (Central Processing Unit) or the like that performs control processing and calculation processing, and an LSI chip is used as the controller 3, for example. The controller 3 further includes a super frame timer 3a clocking the super frame period, a timer correcting part 3b correcting a ratio value R of the super frame timer 3a, and a register 3c storing the process data or the like.

The super frame timer 3a clocks the super frame period (65536 us) based on the preset ratio value R (super frame clocking process). As such, by performing correction by increasing and decreasing the ratio value R, the error of the super frame period clocked by the super frame timer 3a can be corrected. Here, the ratio value R is the value (0.0 to 1.0) that sets the ratio of a natural period (fixed cycle) of the super frame timer 3a and a system clock described later.

The timer correcting part 3b corrects the ratio value R of the super frame timer 3a, so as to correct the error of the super frame period clocked by the super frame timer 3a to be within the accuracy allowable range (within 20 ppm) complied with the WiMedia standard (timer correcting process). In the register 3c, the ratio value R of the super frame timer 3a is set. The external crystal oscillator 2, the physical layer 4, and the memory 5 are connected to the controller 3.

The external crystal oscillator (reference clock generator) 2 generates the first reference clock signal S1 of approximately 30 MHz, for example, and supplies this first reference clock signal S1 to the controller 3 (first reference clock generating process). The controller 3 doubles the frequency of the first reference clock signal S1 that is supplied using a PLL (Phase Locked Loop) to use the signal as a system clock signal of 60 MHz.

The antenna 6 is connected to the physical layer (PHY) 4. The physical layer 4 of the communication device 1 mounted in the WUSB host 100 performs WUSB communication with each of the WUSB devices 101 through the antenna 6. Note that the physical layer (PHY) LSI is used as the physical layer 4, as an example.

The physical layer 4 includes a clock generator 4a generating the second reference clock signal S2, and a register 4b storing the data. The clock generator 4a generates the second reference clock signal (PHY clock signal) S2, and supplies the generated second reference clock signal S2 to the controller 3 (second reference clock generating process). Note that the second reference clock signal S2 is formed to satisfy the accuracy of 20 ppm based on the standard in WiMedia MAC PHY Interface.

The memory 5 stores various set data, control programs or the like executed by the controller 3. Note that a serial ROM is employed as the memory 5, as an example.

Figure 4:
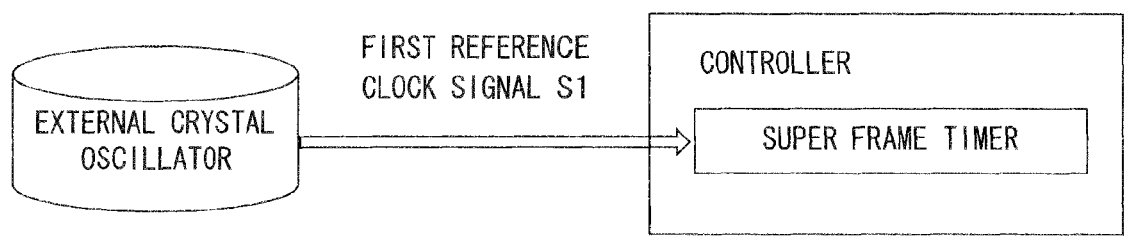
FIG. 4 shows the configuration in which a super frame timer clocks a period of super frame only using a first reference clock signal generated by an external crystal oscillator according to a related art.

By the way, the external crystal oscillator is the crystal oscillator that is externally mounted. Thus, the external crystal oscillator may not satisfy the accuracy of 20 ppm based on the WiMedia standard. Because of this, when the super frame timer clocks the super frame period only using the first reference clock signal generated by the external crystal oscillator (FIG. 4), the error of the super frame period may be outside the range of the accuracy allowable range of the WiMedia standard.

Figure 5:
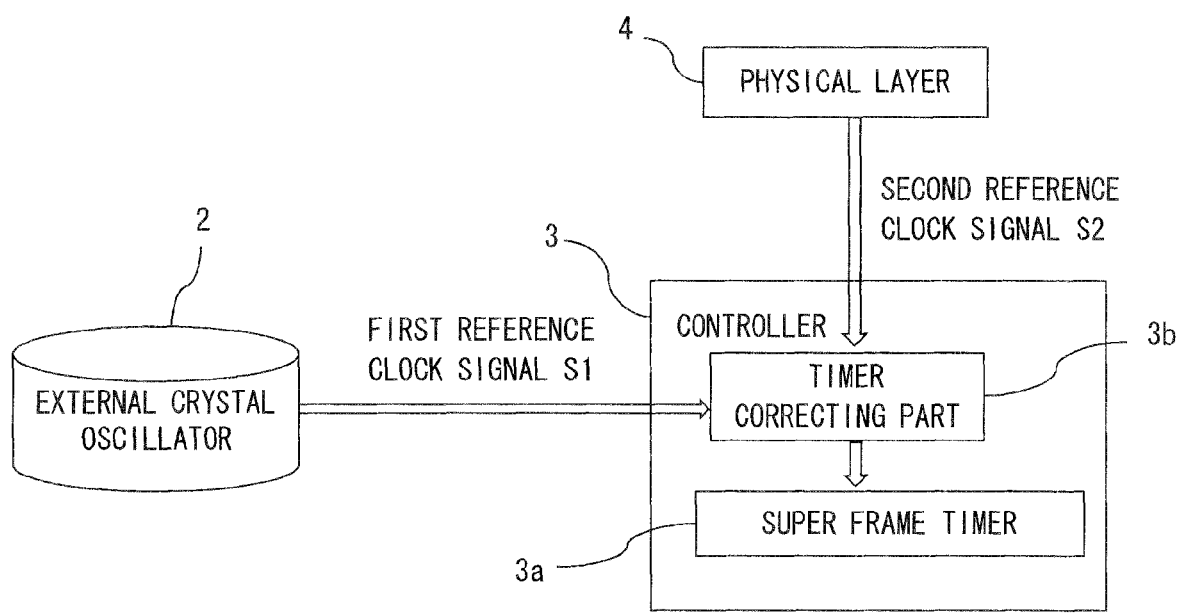
FIG. 5 shows the configuration in which a timer correcting part corrects a super frame timer using a first reference clock signal from an external crystal oscillator and a second reference clock signal from a physical layer according to the exemplary embodiment of the present invention.

In the communication device 1 according to the exemplary embodiment, the timer correcting part 3b corrects the ratio value R of the super frame timer 3a using not only the first reference clock signal S1 from the external crystal oscillator 2 but also the second reference clock signal S2 generated by the clock generator 4a of the physical layer 4 that satisfies the WiMedia standard (FIG. 5). Accordingly, the timer correcting part 3b automatically corrects the error of the super frame period clocked by the super frame timer 3a to be within the accuracy allowable range of the WiMedia standard with reference to the second reference clock signal S2 of the physical layer 4 that satisfies the WiMedia standard. As such, the error correction of the super frame timer 3a can be performed in a simple way and with high accuracy.

For example, when the communication device 1 is manufactured in large quantities, an error may occur in the super frame period clocked by the super frame timer 3a of each of the communication devices 1 immediately after the manufacture or during a time at which the communication devices 1 are used. Even in this case, according to the communication device 1 according to the exemplary embodiment, the timer correcting part 3b automatically corrects the error in clocking of the super frame timer 3a to be within the accuracy allowable range of the WiMedia standard. As such, even if a user lacks technical knowledge (knowledge of the WUSB products, WiMedia standard or the like), the error correction of the super frame timer 3a can be performed in a simple way. Furthermore, the above-described error correction can be performed without using a special external measurement device, which results in cost reduction.

Now, a method of correcting the ratio value R of the super frame timer 3a by the timer correcting part 3b as shown in FIG. 5 will be described in detail.

Figure 6:
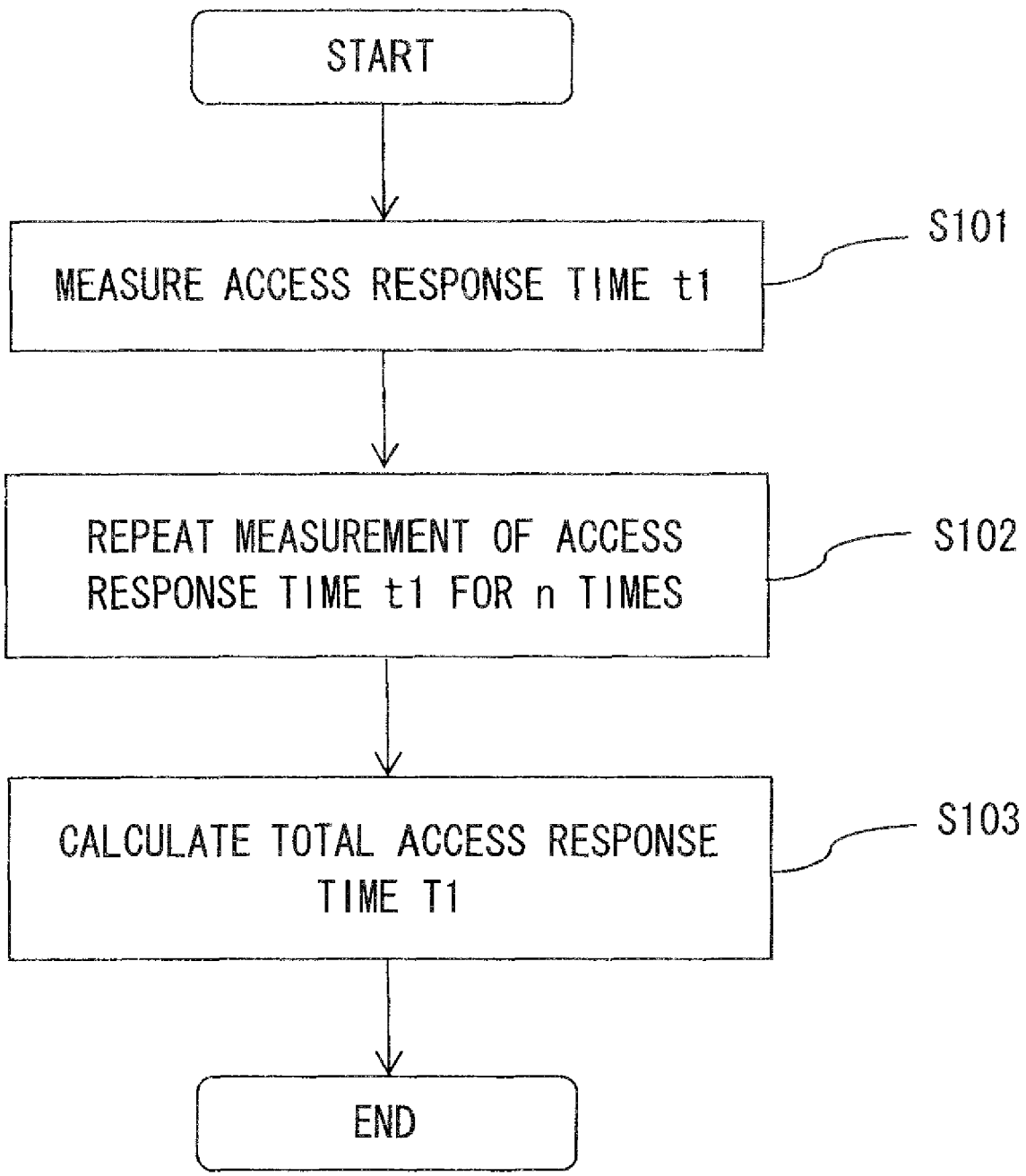
FIG. 6 is a flow chart showing a process flow of a method of calculating a total access response time T1 which is the reference in the physical layer.

FIG. 6 is a flow chart showing a process flow of a method of calculating a total access response time T1 which is the reference in the physical layer 4.

First, the timer correcting part 3b measures an access response time t1 when the clock generator 4a of the physical layer 4 accesses the specific address X of the register 4b, to set the number of times of access n (step S101).

Further, the timer correcting part 3b repeats the measurement of the access response time t1 for n times (step S102), calculates the total access response time T1 (T1=t1×n) when repeated for n times (step S103) and sets the total access response time T1 as the reference value that will be described later.

Figure 7:
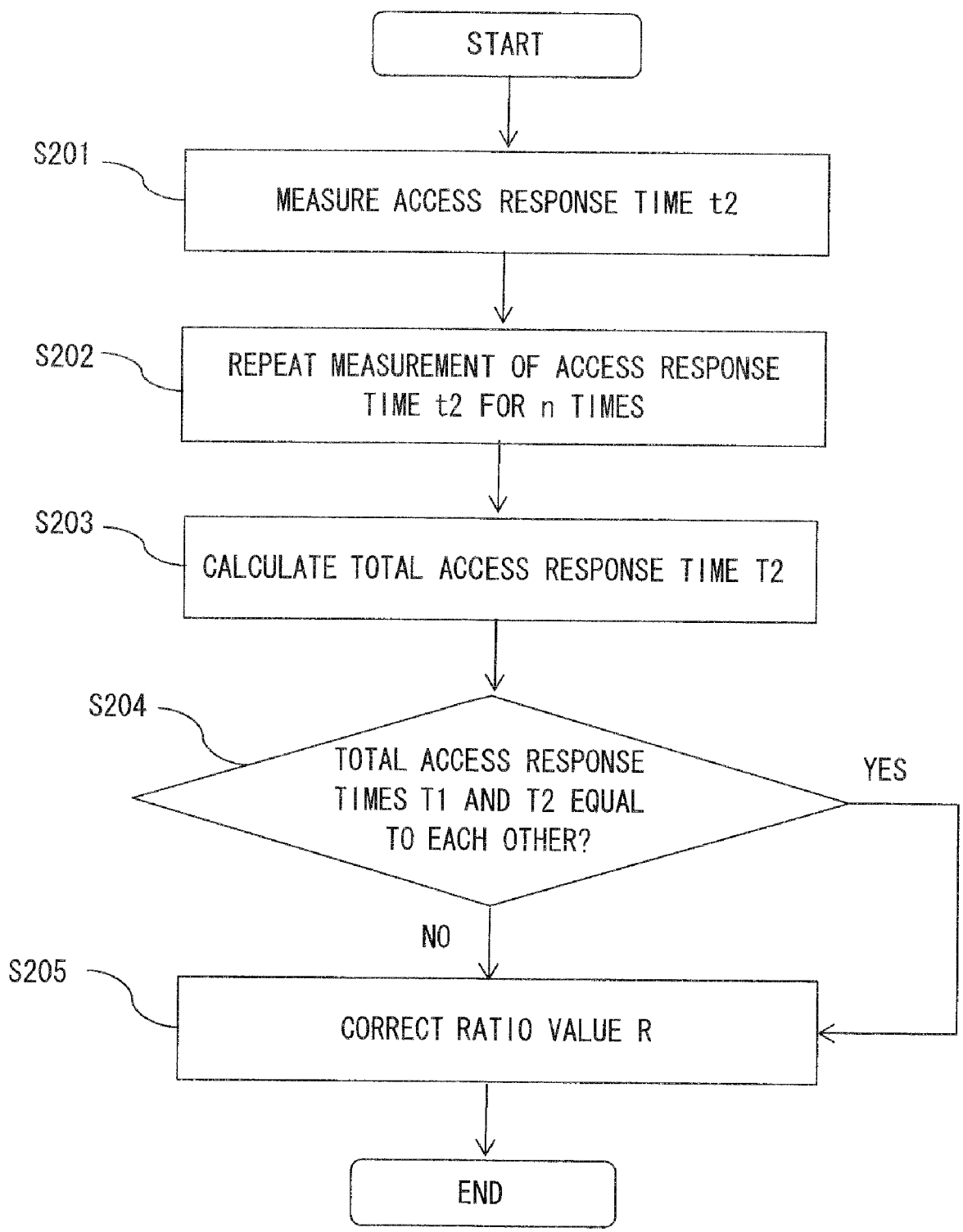
FIG. 7 is a flow chart showing an example of a correction process flow for correcting a ratio value R of the super frame timer.

Next, explanation will be made in detail of the correction process flow when correcting the ratio value R of the super frame timer 3a using the total access response time T1 of the reference value calculated by the timer correcting part 3b FIG. 7 is a flow chart showing one example of the correction process flow for correcting the ratio value R of the super frame timer 3a.

The timer correcting part 3b measures an access response time t2 when the system clock signal from the external crystal oscillator 2 accesses the specific address X of the register 4b (step S201).

Further, the timer correcting part 3b repeats the measurement of the access response time t2 for n times (step S202), to calculate a total access response time T2 (T2=t2×n) when repeated for n times (step S203).

Further, the timer correcting part 3b compares the total access response time T1 from the clock generator 4a of the physical layer 4 that is calculated in the above step with the total access response time R2 from the external crystal oscillator 2, so as to determine whether the total access response time T1 and the total access response time T2 are equal to each other (T1=T2) (step S204).

Upon determining that the total access response time T1 and the total access response time T2 are equal to each other (YES in step S204), the timer correcting part 3b terminates the correction processing. In this case, the ratio value R set in the register 3c of the controller 3 is not corrected. Thus, the super frame timer 3a performs the clocking of the super frame period using the ratio value R which is initially set.

On the other hand, upon determining that the total access response time T1 and the total access response time T2 are not equal to each other (T1>T2 or T1<T2) (NO in step S204), the timer correcting part 3b corrects the ratio value R set in the register 3c (step S205) and terminates the correction processing.

In this case, the timer correcting part 3b first calculates the difference value ΔT (ΔT=|T2−T1|) between the total access response time T1 and the total access response time T2 that are the reference values. Then, the timer correcting part 3b corrects the ratio value R stored in the memory 5 so that the calculated difference value ΔT decreases (difference value ΔT becomes 0). As such, the ratio value R can be corrected to the proper value with reference to the second reference clock signal S2 generated by the clock generator 4a of the physical layer 4 satisfying the WiMedia standard.

As stated above, the timer correcting part 3b in the communication device 1 according to the exemplary embodiment corrects the ratio value R of the super frame timer 3a based on the first reference clock signal S1 from the external crystal oscillator 2 and the second reference clock signal S2 from the clock generator 4a of the physical layer 4 satisfying the WiMedia standard. Accordingly, the timer correcting part 3b is able to automatically correct the error of the super frame period clocked by the super frame timer 3a to be within the accuracy allowable range with reference to the second reference clock signal S2 of the physical layer 4 satisfying the WiMedia standard. Thus, the error correction of the super frame timer 3a can be performed in a simple way.

Although the exemplary embodiment has been described for the purpose of explaining the present invention, the present invention is not limited to the exemplary embodiment, but can be changed or modified without departing from the spirit of the present invention.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A communication device, comprising:
    a reference clock generator that generates a first reference clock signal;
    a super frame timer that clocks a period of super frame based on the first reference clock signal generated by the reference clock generator;
    a physical layer that performs wireless communication and generates a second reference clock signal; and
    a timer correcting part that corrects an error in the clocking in the super frame timer based on the first reference clock signal generated by the reference clock generator and the second reference clock signal generated by the physical layer,
    wherein the timer correcting part corrects the error by correcting a ratio value that is a ratio of a natural period of the super frame timer and the first reference clock signal.

2. The communication device according to claim 1, wherein
    the physical layer comprises a register, and
    the timer correcting part corrects the ratio value based on an access time that the first reference clock signal from the reference clock generator accesses the register and an access time that the second reference clock signal from the physical layer accesses the register.

3. A method of correcting a communication device, the method comprising:
    generating a first reference clock signal;
    clocking a period of super frame based on the first reference clock signal;
    performing wireless communication and generating a second reference clock signal by a physical layer; and
    correcting an error in the clocking based on the first reference clock signal and the second reference clock signal,
    wherein the timer correcting part corrects the error by correcting a ratio value that is a ratio of a natural period of the super frame timer and the first reference clock signal.

4. The method of correcting the communication device according to claim 3, wherein
    the physical layer comprises a register, and
    the correcting corrects the ratio value based on an access time that the first reference clock signal accesses the register and an access time that the second reference clock signal accesses the register.

* * * * *